United States Patent [19]
Beuk et al.

[11] Patent Number: 5,923,267
[45] Date of Patent: Jul. 13, 1999

[54] DEVICE WITH A HUMAN-MACHINE INTERFACE

[75] Inventors: Leonardus G. M. Beuk; Albart J. Kip, both of Eindhoven, Netherlands

[73] Assignee: U.S. Philips Corporation, New York, N.Y.

[21] Appl. No.: 09/090,002

[22] Filed: Jun. 2, 1998

Related U.S. Application Data

[63] Continuation of application No. 08/758,983, Dec. 2, 1996, Pat. No. 5,844,500, which is a continuation of application No. 08/267,265, Jun. 1, 1994, abandoned, which is a continuation of application No. 07/881,016, May 8, 1992, abandoned.

[51] Int. Cl.⁶ .................................................. H04Q 1/00
[52] U.S. Cl. .............................. 340/825.56; 340/825.31; 341/22
[58] Field of Search ................. 340/825.56, 825.31; 341/22, 23, 31, 34, 20, 21, 27; 379/52, 368; 395/118, 120

[56] References Cited

U.S. PATENT DOCUMENTS

| | | | |
|---|---|---|---|
| 4,028,695 | 6/1977 | Saich | 341/22 |
| 4,202,038 | 5/1980 | Peterson | 341/23 |
| 4,390,861 | 6/1983 | Cohen et al. | |
| 4,700,377 | 10/1987 | Yasuda | 341/22 |
| 4,818,048 | 4/1989 | Moss | 340/705 |
| 5,311,175 | 5/1994 | Waldman | 341/22 |

FOREIGN PATENT DOCUMENTS

| | | | |
|---|---|---|---|
| 3700913 | 7/1988 | Germany | G06F 3/023 |
| 3189986 | 8/1991 | Japan . | |

OTHER PUBLICATIONS

NTIS Tech. Notes, vol. B, No. 6, Jun. 1986, p. 672, NASA Tech. Brief.

*Primary Examiner*—Brian Zimmerman
*Attorney, Agent, or Firm*—Anne E. Barschall

[57] ABSTRACT

A device with a human-machine interface for use as a user control interface, particularly in an automotive environment, which temporarily makes an indication of the function of a control organ perceptible, when the user begins to actuate it, but has not yet definitively actuated it. The device with a human-machine interface helps the user to find the right control organ, or warns about dangerous control organs. Moreover, ways of finding groups of control organs and verifying the setting of groups of control organs are made possible.

1 Claim, 3 Drawing Sheets

DEVICE WITH A HUMAN-MACHINE INTERFACE

Cross Reference To Related Applications

This is a Continuation of Application Ser. No. 08/758,983 filed Dec. 2, 1996 now U.S. Pat. No. 5,844,500, which is a Continuation of Application Ser. No. 08/267,265 filed Jun. 1, 1994, now Abandoned, which is a Continuation of Application Ser. No. 07/881,016 filed May 8, 1992, now Abandoned.

The invention relates to a device with a human-machine interface.

From the German Offenlegungsschrift DE 3700913 a user control interface for a computer device is known, in which the control organs are keyboard keys, which can be actuated by pressing. Images corresponding to the keys are displayed together on a display screen, providing an identification of the function associated with each key.

In order to press a key, the user has to take the prior action of placing a finger on the key, and the device has means to detect this prior action. Upon placing the finger on the keyboard, the corresponding key on the display is highlighted, for example by changing its color. Upon pressing, a function of the key is effected. In this way, after touching the key, the user is given the option of giving a follow-up to the impending actuation by pressing the key, or, if an undesired key is touched, removing the finger without pressing the key. Thus, the physically impending actuation (touching) is a precondition for actuation (pressing), but the actuation need not inevitably follow the impending actuation.

In this way, the user can operate the keyboard and check which key is about to be actuated without having to divert the eyes from the display screen.

The known device has the problem that it occupies at least part of the device's output interface, even when no keys are to be actuated. In this way it reduces the amount of other information that can be passed by the output interface. It also diverts the user's attention without useful purpose. Apart from reducing the capacity for communication with the user, this may even be dangerous, for example in vehicles, like cars, (motor-)bicycles et cetera, which have many systems pertaining to them, that is, systems that are operable under normal driving circumstances. Some of these systems, like the lighting system, are essential for the driving vehicle. Others like heating systems, car radios, telephones, navigation systems or cassette player perform a supporting function. Such systems may be operated while the vehicle is being driven by actuating selected control organs. For safety reasons, it is desirable that the driver should not need to avert his or her eyes from the road in order to find a control organ. At the same time, the risk of erroneous control actions due to selection of a wrong control organ, which is significant if the driver has to grope for the control organs without looking, has to be minimized.

Amongst others, it is an object of the invention to provide a device with a human-interface which will not unduly burden the eyes of the user, and yet will also minimize the risk of activation of the wrong control functions.

To attain the object, there is provided a device with a human-machine interface, the device comprising an actuable control organ for selectably controlling a function of the system, the device comprising means for detecting a user action representative for physically impending actuation of the control organ, the device having means for, upon detecting, temporarily disclosing via output means, an indication of the selected function to the user.

Here "disclosing via output means" is used in its meaning of "making perceptible what was not perceptible immediately before via the output means" to the user.

The device, with a human-machine interface arranged according to the invention, is designed to ensure that actuation by the user is the result of a coherent movement, comprising reaching for the control organ and actuating it. Accordingly, "a user action representative of impending physical actuation" is meant to refer to any stage or result of such a coherent movement prior to actual actuation. This user action serves as a signal that further progression of the movement will lead to actual actuation. Upon detecting such impending actuation, the device with a human-machine interface according to the invention brings the function of the control organ temporarily to the attention of the user by disclosing an indication of that function. This indication may be the name of the function or simply a distinctive warning signal. If the indication corresponds to the one desired by the user, the user will proceed with the coherent movement and actuate the control organ, the actuation being effected for example by pressing, or turning, or holding the control organ for some time. If the indicated function is not desired, the user will not proceed to the actual actuation stage, thus averting execution of an undesired function.

Since the device with a human-machine interface is arranged such that the indication is temporary, some time after the actuation the indication will no longer be perceptible. Thus the users' attention will not be distracted for an indefinite amount of time.

In principle, all control organs of a device with a human-machine interface may be provided according to the invention, but in practice it may suffice to arrange only potentially damaging or irreversible control functions, like switching off headlights of a car or detuning a car radio, in this way.

An embodiment of the device according to the invention is characterized, in that the output means are general purpose output means. General purpose output means are usable for communicating more than one type of item of information, like indication of different functions, via the same communication channel to the user. For example, the same spot on a display screen may be used for disclosing indications of different functions, depending on the function for which impending actuation is detected.

An embodiment of the user control device with a human-machine interface according to the invention, is characterized, in that the output means comprise means for disclosing the indication with an audible message. This has the additional advantage that the indication will be perceptible no matter where the user is looking: the user is not visually burdened by the device with a user control interface at all. An audible message moreover intrinsically only discloses information temporarily during the time it is uttered.

An embodiment of the device according to the invention is characterized, in that it is a device pertaining to a vehicle. Especially in vehicles, like cars, motorcycles etc. it is advantageous that the users' eyes are not unduly drawn from the road.

Another embodiment of the device with a human-machine interface according to the invention is characterized, in that the output means comprise a head up display, arranged for temporarily projecting the indication upon a windscreen. Thus, the user need not divert from the normal (drivers) viewing direction of the eyes to verify the control function.

In another embodiment of the device with a user control interface according to the invention, the control organ is provided outside the normal line of sight from a drivers position. The control organs may be provided for example with a cover, or placed adjacent to the drivers seat or underneath it, or be made undistinguishable from their surroundings. This has the advantage that the user will not be tempted to avert the eyes from the road. Additionally, it reduces the number of controls visible on the dashboard, which is advantageous for aesthetic and ergonomic reasons. Moreover, in automobiles, this makes it more difficult for would-be thieves to evaluate the features of a parked car.

In a further embodiment of the device with a human-machine interface according to the invention, the control organ is part of a coherently placed group of control organs for activating respective functions from a function group, the indication being indicative of said function group as a whole. This is advantageous because it helps the user to get an overall indication of which group of control organs is being approached. Of course, in this case the means for detecting the user action may be provided detecting impending actuation of further control organs in the group as well and not just for detecting impending actuation of only one control organ. When there are several groups of control organs, indication-of the group being approached will aid in finding the right group. When the function group is reassignable (the same group of control organs for example being assignable to control of a car radio or to control of a car telephone) this will moreover serve to inform the user whether the desired group of functions is assigned.

Accordingly, in another embodiment of the device with a human-machine interface according to the invention, it comprises means for redefining the function group and the respective functions.

In an embodiment of the device with a human-machine interface according to the invention, device with a human-machine interface comprises means for detecting a first and second stage of said user action, the device with a human-machine interface being arranged such that the first stage is representative of physically impending entry into the second stage, the second stage being representative of physically impending actuation of the control organ, the device with a human-machine interface comprising means for, upon detecting the first stage, temporarily disclosing said indication, and upon detecting the second stage, disclosing, via the general purpose output means, a further indication which, within the group of control organs, is specific for the control organ. In this way the advantages of the group indication and the single control organ indication are combined.

In a further embodiment of the device with a user control interface according to the invention, it is arranged for effecting said disclosing only when, after detecting said user action, actuation of the control organ is not detected within a predetermined period of time. In this way the user can avoid being burdened by the disclosing through acting quickly, for example within a predetermined time of a few tenths of a second. This is convenient for an example for experienced user, or for a user which is already confident about the function of the control organ after trying a neighboring control organ.

In another embodiment of the device with a user control interface according to the invention it is arranged for disabling the disclosing when actuation of the control organ is detected. In this way, once the decision to execute the control function is effected, the user is not burdened longer than necessary by the disclosing.

In a further embodiment of the device with a user control interface according to the invention, it is arranged for disclosing a further indication of the function when actuation of the control organ is not detected within a further predetermined period of time after detecting said user action. Thus a hesitant user can be helped, for example by providing help information explaining the function of the control organ; a useful time interval before providing help information is in the order of several seconds.

In an embodiment of the device with a user control interface according to the invention, the control organ is arranged for analog actuation of the function. Analog control settings tend to be hard to reproduce and should preferably not be altered inadvertently. Hence, for example a tuning dial, or a loudness control knob may be arranged for disclosing indication of their function in order to prevent inadvertent manipulation.

In a further embodiment of the device with a user control interface according to the invention, it comprises proximity sensing means for generating a user action detection signal, the proximity sensing means being arranged to be responsive to approach of a human finger. This is advantageous in a vehicle because in such an environment the user is usually reaching for a control organ, that is, unlike in using a computer keyboard, it is a problem to find the plurality of control organs itself. By providing for a response as soon as the user approaches the control organ it is made easier to find the control organs.

The device with a user control interface according to the invention can advantageously be used in car radios and car telephones. By using their sound interface for disclosing the function of the control organs, an extra output interface need not be necessary.

These and other advantageous aspects of the device with a human-machine interface according to the invention will be illustrated using the following Figures.

Figures 1A, 1B, 1C:
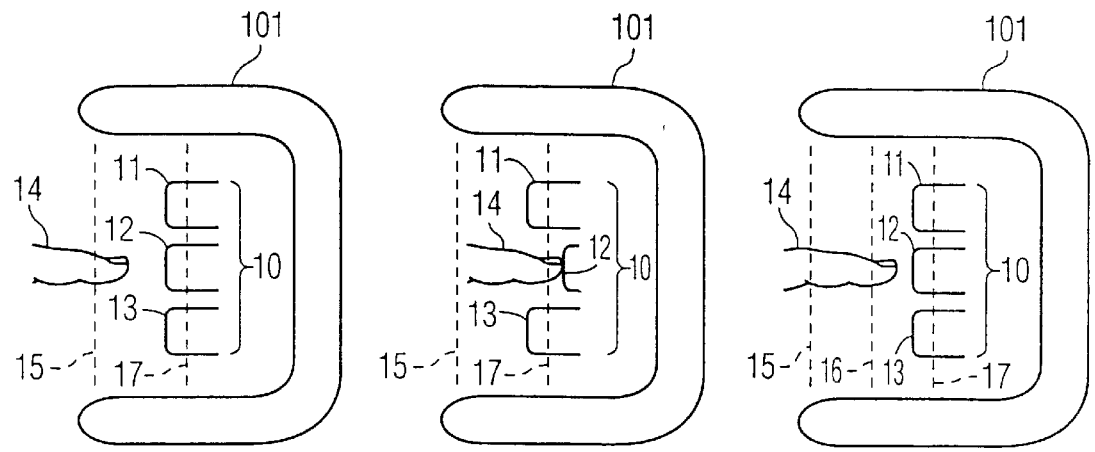
FIGS. 1a, 1b, 1c show an embodiment of the successive types of actuation of control organs in a device with a human-machine interface.

In FIGS. 1a, 1b, 1c a group 10 of control organs 11, 12, 13 for a device 101 with a user control interface is shown. By way of example, the control organs are shown as push buttons which can be pushed by a finger 14. Conventionally, to select one button 12 from the plurality 10, the user must look at the control organs to ensure that the finger is placed on the desired button 12 from the plurality 10.

In vehicles, like cars, (motor)bicycles et cetera in which the user at the same time is responsible for controlling for example the steering wheel and the brakes, it is undesirable that the user should divert his eyes to look at the plurality of control organs 10. Preferably, this should even be made impossible, by placing the control organs outside the normal line of sight from the drivers seat, for example under a cover. Yet, for instance to control a car radio, the user must reach for the control organs; pushing one button reached blindly, that is, without looking at it first, is likely to cause errors, which may be hard to correct—for example in the case of detuning the car radio— or costly—for example in dialing a wrong telephone number on a car phone. An error may even be damaging or dangerous in case the control button pressed erroneously concerns the driving of the car.

To prevent such errors, the device with a user control interface according to the invention provides, upon detection of a user action representative of impending actuation of a control organ, an indication of the function of that control organ in such a way that the user can still prevent the function from being effected by not pursuing the action beyond the stage that lead the interface to conclude that actuation was physically impending. To prevent the user from being unnecessarily distracted by the mechanism for giving this indication, the indication is made available via a standard output interface used for different types of messages. It is made available temporarily, only for a limited time after detection of impending actuation of the control organ, that is, it is made perceptible to the user only at an attempt to actuate a function. This minimizes distraction to the user, as is essential in a vehicle.

Of course a device with a human machine interface without normally perceptible control organs will be useful in other environments than vehicles as well.

To achieve such an interface, the idea is that an actuating action by the user will have successive stages, the interface effecting the function of the control organ only in the final stage, and in earlier stages providing indication of the function of the control organ selected. Thus, the user may avoid effecting the function by selectively breaking off the action before the final stage is reached.

To illustrate the principle, in FIGS. 1a, 1b, 1c, the successive stages are triggered by successive distances of approach of the finger 14 to the control organ 12. The distance of the finger may for example be sensed by a proximity sensor operating by means of light, sound or heat. The stage of physically impending actuation occurs in FIG. 1a when the finger 14 passes the border indicated by line 15 see box 301; when the device with a human-machine interface detects this, it provides an indication of the function associated with the control organ 12 see box 302. Actual actuation is effected in FIG. 1b when the finger 14 passes the border 17 see box 303; this causes the device with a user control interface to effect the function associated with the control organ 12 see box 304. The impending actuation is a physical precondition for the user to perform actuation.

It may be convenient to provide means for detecting two or more stages of actuation of all control organs. However, often it will be more attractive to do so for control organs corresponding to important functions only or for functions which are not easily reversible. This may be more convenient for economic reasons or for giving a higher alerting effect to the indication.

The control organs are often coherently placed in groups of control organs which control related functions. For example in an automotive environment, the controls for heating are placed together, the controls for the car radio are placed together. It may be desirable to report first the function of the group and then the function of a specific control organ before effecting that function. For example to help the user to find a desired group more quickly by giving a coarse indication of the position of the finger. A way to achieve this is illustrated in FIG. 1c, where an intermediate actuation stage is detected when the finger 14 passes the border 16. In an device with a human-machine interface comprising three borders 15, 16, 17, the first border 15 see box 301 might trigger function group indication see box 302, the second border 16 see box 305, specific control organ information see box 306 and the third border 17 see box 303 might cause the function to be effected see box 304.

Function group indication is also particularly useful when the function of a group of control organs may be reassigned as a group, for example when the same control organs selectably either control a car telephone or a car radio. In this case the function group indication serves to warn the user when the function group must be reassigned.

Although the invention was discussed above with respect to pushbuttons, the invention is applicable to any kind of control organs, such as for example potentiometers, either of the rotating or of the sliding variety.

It will be appreciated that there exist various possibilities for implementing detection mechanism for actuation and impending actuation of control organs. The only essential point is that the mechanisms are arranged for detecting more than one physical stage in an action that may lead to actuation, and that these stages are arranged in such a way that, when used by a human user, successive stages are physically preconditions for later stages, but that the later stage may also be foregone if the user decides to.

In its conceptually simplest form this is achieved by providing individual control organs with at least two sensing mechanisms, one for detecting the physically impending actuation, another for detecting the actual actuation, the one being sensitive to an earlier stage of approach of a finger than the other. However, for the purpose of the invention, there need not be a physical relation between means for detecting actuation, and physically impending actuation of a particular control organ:

1) the detecting mechanisms for actuation and impending actuation may be separated physically, that is, be located at geometrically different locations,
2) the detecting mechanisms may be shared among control organs,
3) several control organs may be provided as a single physical device.

To illustrate these possibilities: 1), for example if a push button is used for detecting the actuation, and an optical sensor is used for detecting the impending actuation, there is no need to place the pushbutton and the optical sensor together, as long as they sense the finger in the same region. To illustrate 2), using touch sensitive buttons for detecting the impending actuation (that is, for example capacitive sensors, which are actuated by touching rather than by exerting force) and a force sensor to detect the second actuation, the force sensor may be shared by several control organs since touching of a touch sensor is sufficient to determine which control organ is to receive the actual actuation. This has the advantage that it is guaranteed that both the impending and actual actuation will automatically correspond to the same control organ. To illustrate 3), one may use a common touch sensitive surface provided with means to determine the coordinates of a point where it is touched; the coordinate values are used to select one virtual control organ and to detect the impending or actual actuation for this control organ; in this way one sensor serves for a plurality of control organs. Since according to the invention the functions of the control organs are identified with separate messages, such a touch tablet would require no further distinguishing marks to identify the control organs. Thus, an automobile, or indeed any control interface in any application outside a vehicle, could be provided without visible control organs.

There is also an ample choice of sensors. One implementation uses a proximity sensor for impending actuation (the presence of a proximate object being detected using reflected or absorbed light, sound, electric or magnetic fields etc.) and a push button for detecting the actual actuation. Alternatively, the control organ may be sensitive independently to pushing and touching (without pushing) so as to detect the impending and actual actuation as a consequence of pushing and touching respectively. In another embodiment, the control organ is a normal control organ, for example a pushbutton, which serves to detect the impending actuation; the actual actuation is detected if the button is kept pushed during a predetermined period of time (that is, long enough for the user to realize a mistake from the indication triggered by the first actuation).

In any case, several actuation signals, corresponding to different stages of actuation will have to be derived for the control organ.

Figure 2:
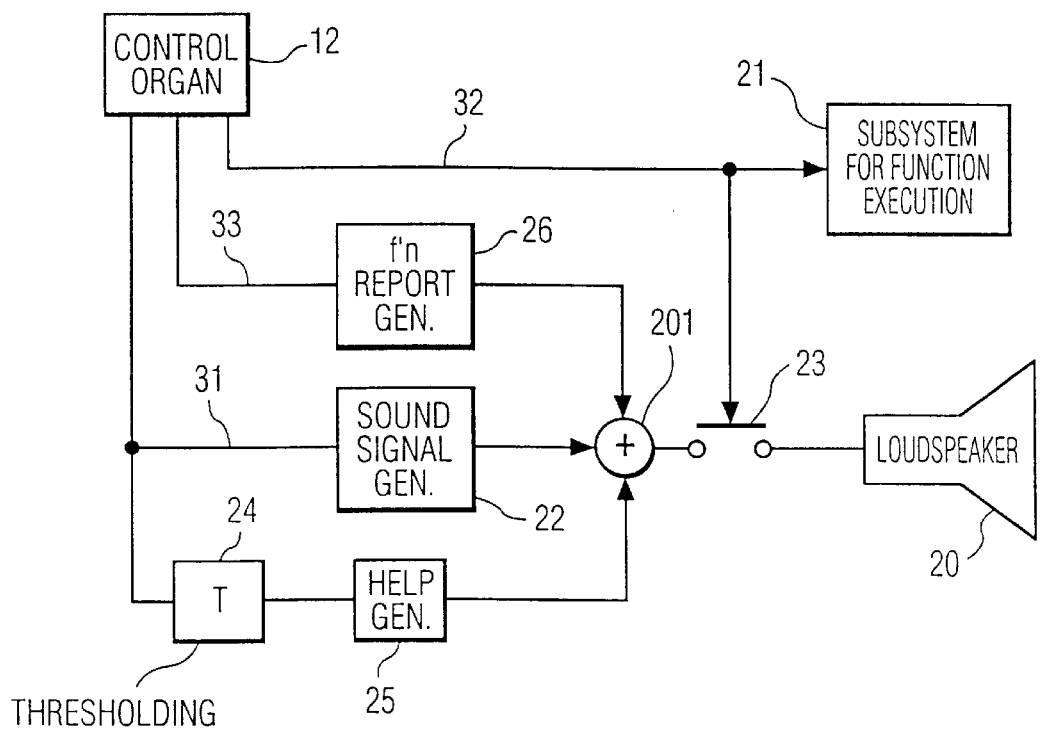
FIG. 2 shows a schematic diagram of an implementation of the device with a human-machine interface according to the invention.
Figure 3A:
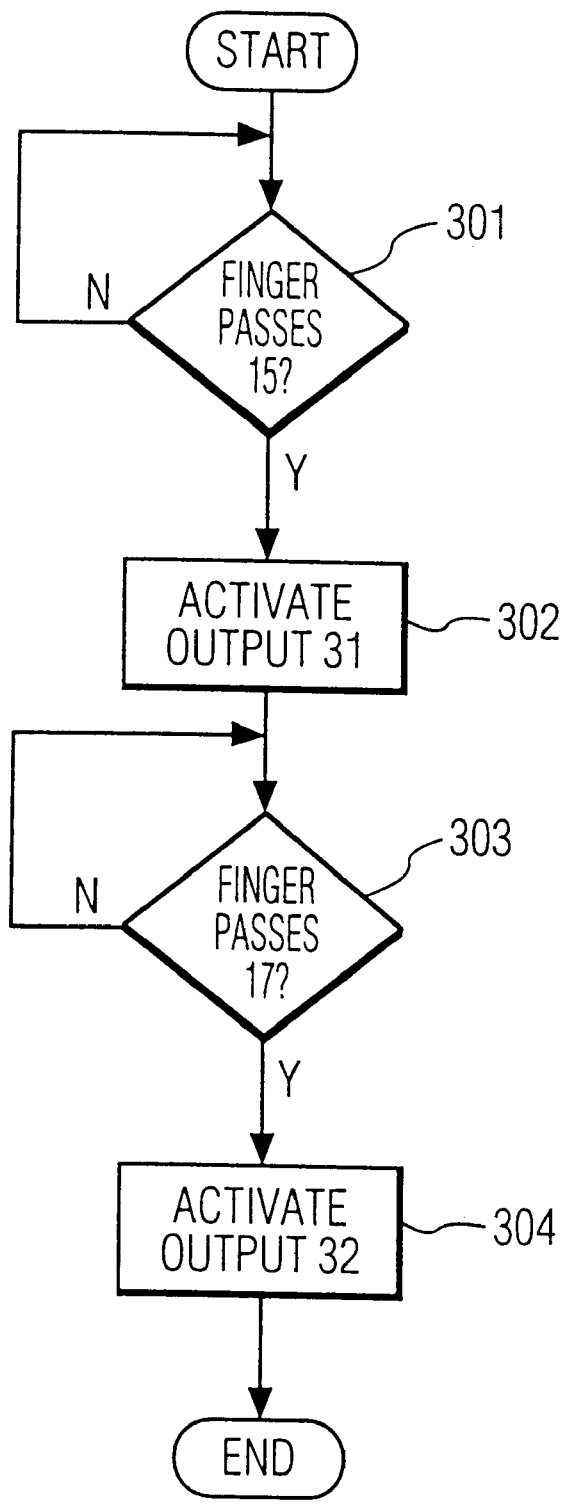
FIG. 3a is a flow chart of the operation of one embodiment of box 12 of FIG. 2.
Figure 3B:
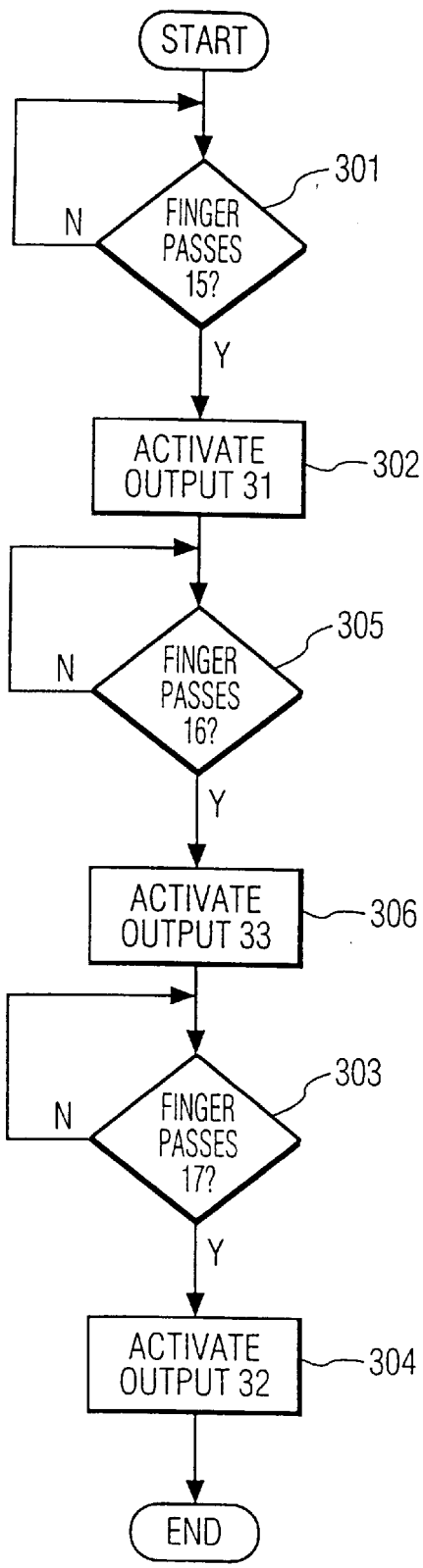
FIG. 3b is a flow chart of the operation of a second embodiment of box 12 of FIG. 2.

FIG. 2 shows an embodiment of an device with a human-machine interface according to the invention. For simplicity, only one control organ 12 is shown, which has outputs 31, 33, 32 for three signals corresponding to detection of the first and second stages of impending actuation and the actual actuation respectively (the second stage being optional). In the embodiment, the first detection output is coupled to a sound signal generation circuit 22, which in turn is coupled to a loudspeaker 20. When the impending actuation is detected, for example after crossing the line 15 in FIG. 1a, the function of the control organ can thus be identified via the loudspeaker. In a vehicle, the use of such an audible indication has the advantage that it does not distract the eyes of the user from the road, and that no distracting signals for the user are present until a control organ is almost actuated. Preferably, the signal generator 22 produces a spoken message, for example by replaying a recorded message or using speech synthesizer, but other signals, such as warning tones which identify functions as dangerous may also be useful.

Alternatively, one may use a display driver 22 and a head up display screen for projecting the information on the windscreen upon detection of impending actuation.

Another output 32 of the control organ 12 is for signalling that the actual actuation is detected, which will effect the function of the control organ. The effecting is symbolized in FIG. 2 by connection of the output 32 to an activating input of a subsystem 21 for function execution.

Several elaborations to the device with a human-machine interface, which are not essential to its functioning, but may be added to give substantial improvements to its effectiveness in minimizing the amount of unnecessary distraction of the users attention are also shown in FIG. 2 and will now be discussed.

First of all, it may be convenient to interrupt the indication of a function once the function is activated by effecting the actual actuation. This is symbolized in FIG. 2 by a switch 23 controlled by the output for the second mode 32 between the signal generator and the loudspeaker. In this way, unnecessary messages are cut short; it may even be convenient to give a slight delay (of the order of a few tenths of a second) to the signal generation 22 in order to enable the unhesitating user to avoid any signalling at all.

Another addition is a second function report generator 26, triggered by detection of a second stage in the action leading up to actuation by the second stage detection output 33. Such stages may for example be detected by detecting a finger at different, decreasing distances to the control organ, but any combination of the detection mechanisms described above may be used, as long as one mechanism will trigger at an earlier stage of the user action than the other. In combination with the first function report generator 22 the first and second stage detection may be used to provide a first function group indication after detection of the first stage of the action and secondly a specific function indication after detecting the second stage of the action. It may be convenient to arrange the device with a user control interface to interrupt the group information if the user activates the specific information.

Furthermore, it may be convenient to provide for additional help information for an extremely hesitating user, by allowing an impending actuation signal to pass through a time duration thresholding circuit 24 for triggering a help information generating circuit 25. In this way, when the state of impending actuation persists, but is not followed up by actuation within, for example, a few seconds, additional help information can be reported via the loudspeaker 20.

Although FIG. 2 has been drawn in the form of a schematic diagram, isolating several functions in separate boxes, it will be appreciated that the part of the interface providing the links between the control organ 12 and the output 20 can also be implemented as a program in a computer system. Outputs of boxes 22, 25, and 26 can be combined to give a single output 20 via an adder 201.

We claim:

1. A method for processing user inputs comprising:

a: sensing a pre-selection action by a user with respect to a function invoking element of a user interface device;

b: awaiting sensing of a subsequent selection action by the user with respect to the function invoking element;

c: recognizing passage of a predetermined period of time during which said awaiting has occurred; and d: providing an identification of the function of the element upon such recognizing.

* * * * *